United States Patent [19]
Manini

[11] Patent Number: 5,334,922
[45] Date of Patent: Aug. 2, 1994

[54] ASYNCHRONOUS MOTOR SPEED CONTROL METHOD AND DEVICE

[75] Inventor: Michelangelo Manini, Bologna, Italy

[73] Assignee: FAAC S.p.A., Bologna, Italy

[21] Appl. No.: 34,295

[22] Filed: Mar. 22, 1993

[30] Foreign Application Priority Data

Mar. 24, 1992 [IT] Italy ............... MI92A000684

[51] Int. Cl.⁵ .................................... H02P 7/00
[52] U.S. Cl. .................................... 318/772; 318/781
[58] Field of Search .............. 318/772, 775–777, 318/779, 798–812, 257, 268, 269, 781, 789, 440, 442

[56] References Cited

U.S. PATENT DOCUMENTS

| | | | |
|---|---|---|---|
| 4,176,306 | 11/1979 | Asano et al. | 318/772 |
| 4,431,958 | 2/1984 | Schutten et al. | 318/816 |
| 4,459,532 | 7/1984 | Schutten et al. | 318/808 X |
| 4,761,563 | 8/1988 | Ross et al. | 307/87 |
| 4,806,838 | 2/1989 | Weber | 318/775 X |
| 4,842,192 | 6/1989 | Range et al. | 34/48 X |
| 4,870,556 | 9/1989 | Inaba et al. | 363/41 |
| 5,021,726 | 6/1991 | Reinhardt et al. | 318/811 |

Primary Examiner—Jonathan Wysocki
Attorney, Agent, or Firm—Shlesinger, Fitzsimmons & Shlesinger

[57] ABSTRACT

A method for control of the speed of an asynchronous electric motor by powering the motor with a single-phase sine wave voltage for its running at rated speed, and supplying it with at least one first partialized voltage formed from the sine wave voltage for a half-period or half cycle thereof, for running the motor at speed reduced to a fraction of its rated speed. A device for applying the method including a first power supply applied to the motor with a sine wave voltage for running at rated speed and a second means power supply applied to the motor with at least one first partialized voltage formed from the sine wave voltage for a half-period of the sine wave every uneven number ns of half-periods thereof for running at a motor speed reduced to a fraction of rated speed. Control apparatus sends activation signals alternately to the first and second power supplies upon reception of control signals requiring running at rated speed or reduced speed.

33 Claims, 4 Drawing Sheets

ASYNCHRONOUS MOTOR SPEED CONTROL METHOD AND DEVICE

BACKGROUND OF THE INVENTION

In the field of movement with electric motors, in applications in which reliability and economy are important, asynchronous 2-phase or 3-phase electric motors are widely used. Again for reasons of economy and reliability the motor is supplied through electromechanical switches and phase displacement capacitors. In this manner there is control of the direction of rotation of the motor but its speed is not controlled in any manner.

For example, a typical application is in automation devices for opening of gates. Indeed, this system is employed by nearly all builders of gate openers even though, while being economical and reliable, it displays various drawbacks, mainly in stopping.

In applications in which the motor controls a mechanical gearmotor it is difficult to find a satisfactory compromise between a sudden stop, which is desirable for minimising positioning inaccuracy, and the stopping space in case of emergency stops and a soft stop, desirable for dissipating kinetic energy of the system with the least possible stress on the mechanical parts.

In applications where the motor controls an irreversible transmission or a hydraulic actuator, where it suffices to remove power from the motor to obtain virtually instantaneous stopping of the structure moved, there are severe stresses in the mechanical parts, especially when moving structures of a certain weight. In addition, there are generally used mechanical limit switches which are reached at full speed by the moving structure. In the former case for example, passage bars, etc., this causes unpleasant vibrations and recoil upon striking against the mechanical limit switch.

To obviate these problems it would be necessary to introduce a motor rotation speed control, at least in the acceleration and braking phases. Those skilled in the art know well the different methods of providing such a control. For example, variable number of poles, utilisation of the torque-speed characteristics by reducing the output and control of the power supply voltage, or a.c.-a.c. conversion for control of power supply frequency and voltage. Unfortunately these techniques are relatively costly to apply.

The general purpose of the present invention is to obviate the above mentioned drawbacks by supplying an economical and reliable method and a device in accordance with said method for asynchronous motor speed control and specifically for the movement of gates, passage barriers and the like.

SUMMARY OF THE INVENTION

In view of said purpose it has been sought to provide in accordance with the present invention a method for asynchronous electric motor speed control comprising power supply of the motor with a sine wave voltage for its running at rated speed and supplying it with at least one first partialized voltage formed by said sine wave voltage for a half-period, for running at speed reduced to 1/ns of rated speed.

In addition, in accordance with the method, it has been sought to provide a device for asynchronous electric motor speed control comprising first means of power supply to the motor with a sine wave voltage for running at rated speed and second means of supplying the motor with at least one first partialized voltage formed by said sine wave voltage for a half-period of the sine wave every uneven number ns of rated speed, control means sending activation signals alternately to said first and second power supply means upon reception of control signals requiring running at rated speed or running at reduced speed.

To clarify the explanation of the innovative principles of the present invention and its advantages compared with the known art there is described below with the aid of the annexed drawings a possible embodiment by way of non limiting example applying said principles. In the drawings:

THE DRAWINGS

PREFERRED EMBODIMENTS OF THE INVENTION

Figure 1:
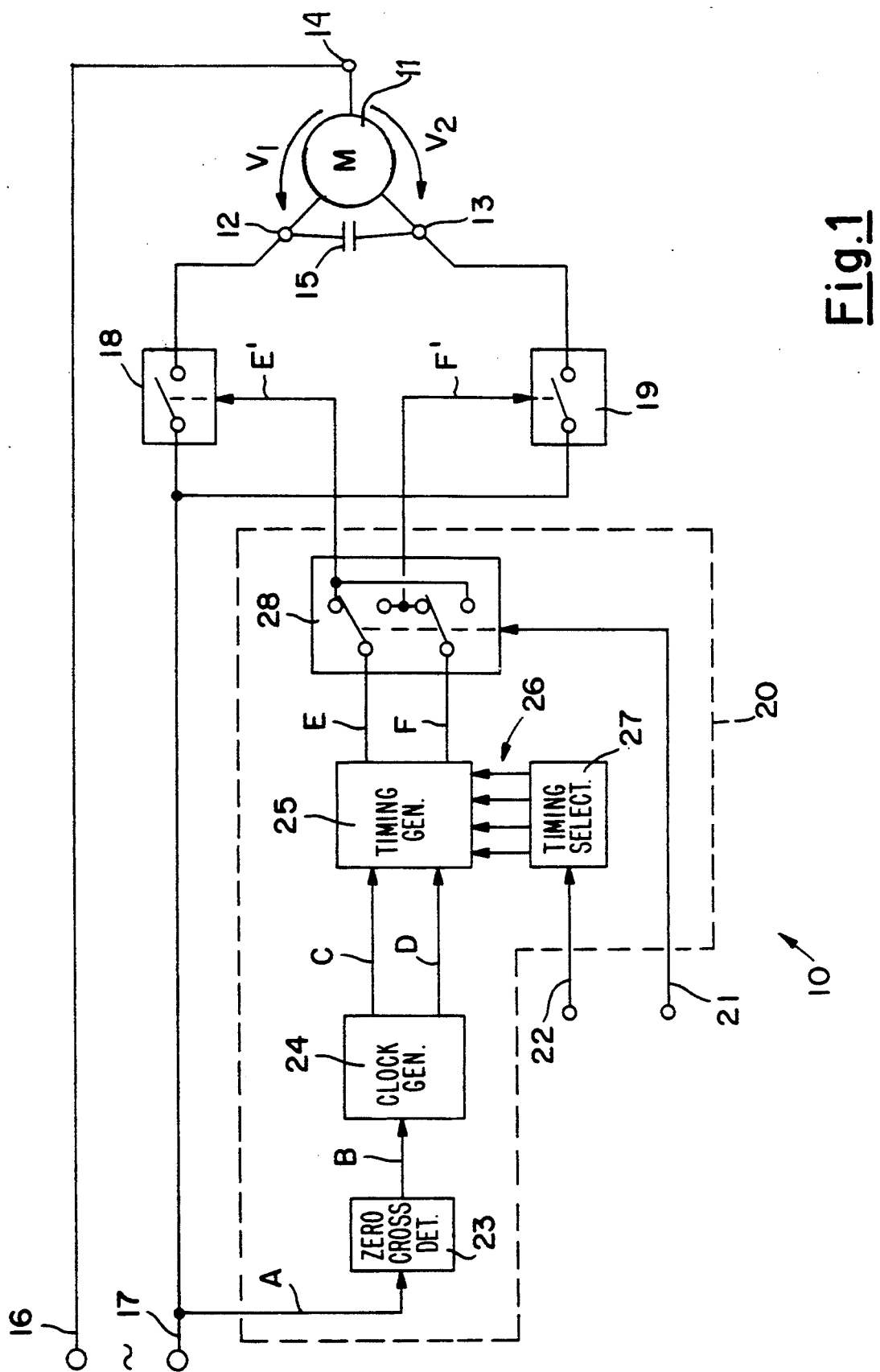
FIG. 1 shows a block diagram of a circuit providing the control method claimed herewith.

With reference to the figures FIG. 1 shows a block diagram of a device, indicated generally by reference number for control of an asynchronous electric motor 11 with power supply terminals 11, 12, 13 to which lead internal electric winding branches phase switched with each other as known to those skilled in the art, The motor 11 can be the 3-phase or the single-phase type. For example, a 2-phase motor will have two equal windings wound at 90° electrical degrees to each other and with a common end at the terminal 14. For a 3-phase motor the windings would be three, arranged at 120° electrical degrees to each other and connected together with a star or triangle connection.

In accordance with the method claimed there are supplied to the motor two voltages V1, V2 with appropriate wave form and reciprocal phase so as to select with extreme simplicity a speed which would be an uneven multiple of the nominal motor speed. In other words, if No is the nominal motor speed (synchronism speed, hence understood as with zero sliding) it is possible to provide with the described method synchronism speeds of No/3, No/5, No/7, etc.

In the specific application of reduced motor speed control only during stopping or starting, e.g. as in the case of a motor for moving gates or passage bars, there has been found to be an optimal speed reduction value, the value No/3. Indeed, the reduction to ⅓ speed leads to a reduction to 1/9 of the quantity of kinetic energy possessed by the mechanical system upon stopping. There is thus low stress on the mechanical parts and the above mentioned phenomena of rebound and swinging are avoided. Greater speed reductions however considerably reduce the torque characteristic of the motor without appreciable improvements in behaviour during stopping. For this reason the following description is made with reference to a 1/3 speed reduction. It will however be clear to those skilled in the art how to provide the other ratio reductions mentioned.

FIG. 2 shows the wave forms which in accordance with the method are supplied to the motor. Specifically, FIG. 2a shows power supply during rotation at speed No, i.e. during normal rated running. The voltage V1 is a sine wave voltage taken directly from the power supply mains while the voltage V2 is a sine wave voltage phase shifted 90° from the first, being taken from said mains voltage through a capacitor 15 (FIG. 1), appropriately sized and arranged between the terminals 12 and 13 of the motor as is normal for asynchronous motors.

Figure 2A:
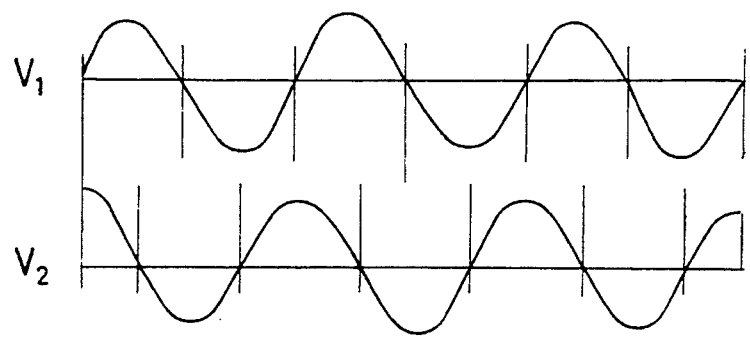
FIG. 2a–2d shows diagrams of power supply voltages in accordance with the method.
Figure 2B:
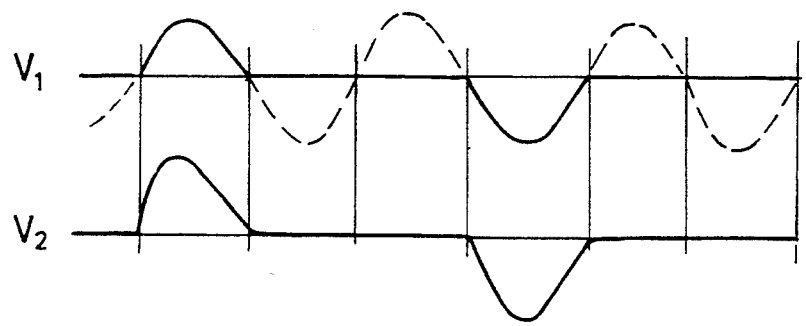
Figure 2C:
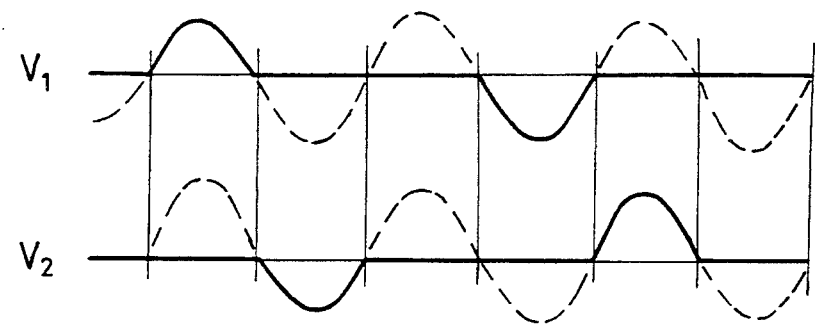

Innovatively, to provide reduced speed rotation there are sent to the motor modified voltages V1 and V2 taken from the sine wave mains voltage taking therefrom only a half cycles thereof, or half-period every uneven number of half-periods with ns equal to that of the speed ratio it is desired to obtain. For example, a half-period every three half cycles or half-periods to obtain No/3. In this manner a voltage is synthesised which is still a good sine wave approximation but with frequency equal to 1/ns of mains frequency. The effective value of this voltage is also equal to 1/ns. FIGS. 2b and 2c show simplified wave forms (with no allowance for reactive effects) for the case where ns=3.

FIGS. 2b and 2c show two different ways of powering the motor at reduced speed on the wave form synsesis principle just described. FIG. 2b shows a single-phase power supply where only V1 is synthesised from the mains while 15 is provided by phase-shifting V1 through the capacitor V2 Theoretically the capacitance value should be calculated to find a 90° electrical degree phase shift. For the sake of simplicity, it is possible in practice however to use the same capacitor 15 used in rated speed operation. In this case the phase shift will be less than 90° with a resulting decrease in torque because of the elliptic nature of the electrical field.

FIG. 2c shows the second way of slowed power supply consisting of a 3-phase power supply provided by application to the motor of voltages V1 and V2, both synthesised from the mains voltage and phase-shifted 120 electrical degrees. The third phase, which is the reverse of the sum of the two signals applied, is located at the common terminal 14. In this 3-phase power supply the capacitor 15 is not necessary but is left connected for simplicity since it does not appreciably disturb operation of the system.

Figure 2D:
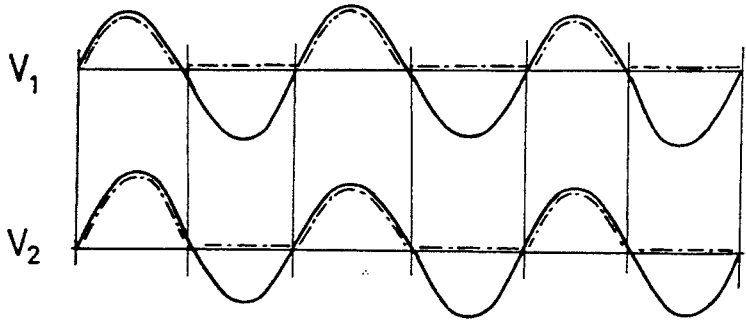

Finally, FIG. 2d shows in solid lines a braking power in which the voltages V1 and V2 are derived directly from the mains voltage without phase switching so that, substantially, the motor is short-circuited and hence braked. As an alternative, the motor can be braked by supplying both the phases for one ball-period every two, as shown in dot-dash lines.

There are thus four ways of supplying the motor, i.e. normal single-phase power supply, slowed single-phase power supply, slowed 3-phase power supply, and braking power supply (with whole or half wave). Naturally, as is readily understandable for those skilled in the art, the direction of rotation of the motor can be reversed by merely exchanging the voltages V1 and V2 on the motor terminals.

Returning to FIG. 1, the circuit 10 which provides in a simple manner the four power-supply modalities comprises a single-phase sine wave power supply consisting of a first line 16 connected to the terminal. 14 of the motor and a line 17 connected through controlled switches 18 and 19 to the terminals 12 and 13 of the motor. Given the speed and accuracy of intervention required at the switches, they are provided in the known form of static switches, such as triacs, transistors, power and the like.

The switches 18, 19 are controlled by signals E', F'. At a high level of the control signal the switch closes while at a low level it opens. These control signals are powered by a control circuit 20 which is controlled, e.g., by a line 21 which establishes the direction of movement of the motor and a line 22 which controls starting and stopping of the motor 11 in accordance with modalities clarified below.

The circuit 20 comprises a first block or zero crossover detector 23 for detection of the passage through zero of the mains sine wave supplied at 16, 17. Substantially, this block, known per se, receives as input the mains sine wave, indicated by A in FIG. 3, and emits a pulse every time the sine wave passes through zero.

Figure 3:
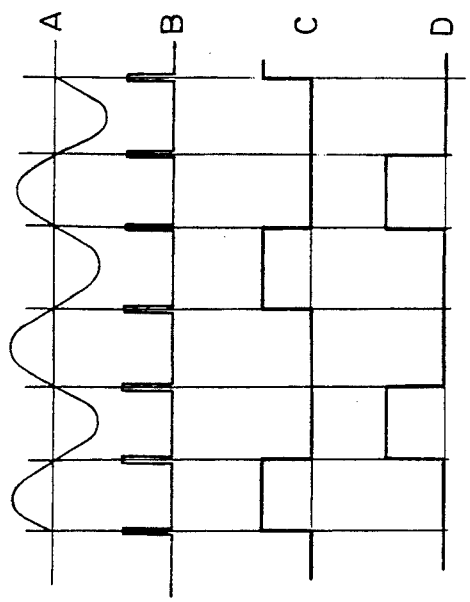
FIG. 3 shows wave forms present in the circuit of FIG. 1.

This series of pulses (indicated by B in FIG. 3) is used by the rest of the circuit to synchronise opening and closing of the switches 18, 19 in such a manner as to always fall opposite a zero of the mains power supply. For this purpose the series of pulses B is sent as a clock signal to a second block or clock generator 24 for synchronised generation of two signals indicated in FIGS. 1 and 3 by C and D. The block 24 can be provided as a sequential circuit, readily conceivable by those skilled in the art, which, as shown in FIG. 3, upon reception of a clock pulse takes output C to a high level, upon the following pulse again lowers output C add raises output D, upon the following pulse lowers the output D and so on. The result is two rectangular waves, C and D respectively, phase-shifted by one half-period of the mains voltage and having a high level for one half-period every three of the sine wave A (if a speed reduced by 1/3 is desired), The signals C and D are sent to a selector circuit 25 which emits them at E and F depending on the status of selection signals 26 produced by a timing selection circuit 27. The signals E and F are then sent through a switching circuit 28 to the control terminals of the switches 18 and 19. The switching circuit is controlled by the line 21 to exchange the signals E, F when it is desired to change the motor rotation direction.

The selection signals 26 can be four, one for each motor power-supply modality. Upon sending to the block 25 the normal running signal, said block emits on the output E a high level add on the output F a low level. Upon sending of the single-phase slow-running signal the block 25 emits from the output E the signal C and on the output F a low level.

Upon sending of the 3-phase slow-running signal the block 25 emits from the output E the signal C and on the output F the signal D. Upon sending the braking signal, the block 25 emits, both from the output E and the output F, a high level. Finally, if no power modality is selected, the block 25 will have both outputs at low level.

It is clear that each of the indicated selections of E, F involves operation of the corresponding switches 18, 19 to obtain the related wave form of FIG. 2.

Figure 4A:
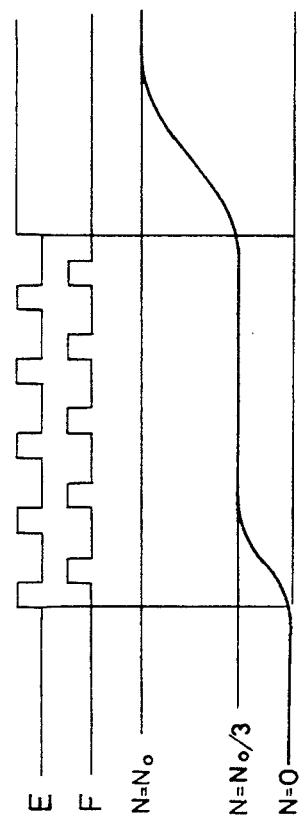
FIG. 4a–4c shows diagrams of the speed of an electric motor depending on control parameters in accordance with the present invention.

Although the passages between the various modalities of power supply can be performed in any order; some transition sequences have been found particularly advantageous for specific uses, also depending on the fact that the 3-phase and single-phase slow power supplies have different torque characteristics, For example, FIG. 4 shows possible transitions between the rated speed N=No and the null speed N=0 and vice versa associated with the corresponding signals E and. F. In particular, FIG. 4a shows a first advantageous transition sequence between N=No and N=0. Initially there is selected the maximum speed modality. The transition between speeds No and No/3 is obtained by applying for a preset time the single-phase reduced speed power supply. The speed torque characteristic of this power supply presents a relatively low resistant maximum torque.

Therefore, the braking torque applied to the mechanical system is low, thus favouring progressive dissipation of kinetic energy with resulting deceleration free of excessive stresses on the mechanical members.

This is particularly useful with motors controlling mechanical reduction gears. When the reduced speed of No/3 is reached it is held by applying reduced 3-speed power, which displays a more favourable torque-speed characteristic, even better than the maximum speed characteristic. For permanent stopping of the motor it suffices to supply at the appropriate moment braking power for a predetermined time and then completely remove power from the motor.

Figure 4C:
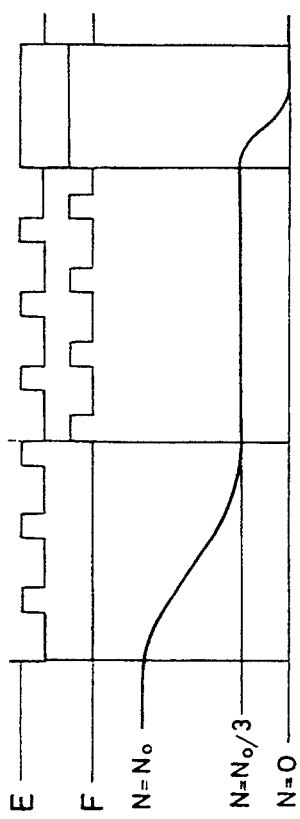
Figure 4B:
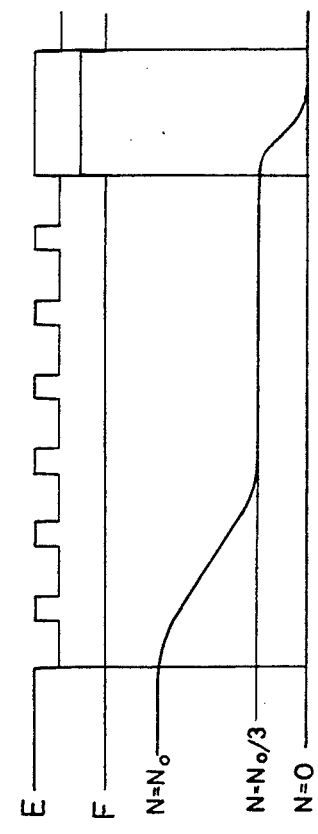

When the maximum torque required at reduced speed is sufficiently low, it is also possible to avoid use of reduced 3-phase power, as shown in FIG. 4b. An application where this is possible is for example that where the motor drives a hydraulic actuator pump.

The greater peak torque of the power at reduced 3-phase speed is useful at the beginning of the movement to improve starting of motion, especially in very critical cases such as for example those characterized by the presence of strong friction points due to wear of mechanical guides or the like, or under severe environmental conditions with the presence of ice or snow on the parts to be moved, a fairly common occurrence in the use of the motor in gate opening mechanisms. FIG. 4c shows the possible starting sequence with reduced 3-phase power at the beginning and then normal power.

The starting and stopping sequences can be controlled by the timed selection block 27, which, upon reception on the line 22 of a starting signal, commands the control signals 26 in the sequence corresponding to FIG. 4c. Upon reception on the line 22 of a stop signal, the block 27 commands execution of the sequence corresponding to FIGS. 4a or 4b, depending on the specific application.

Figure 5:
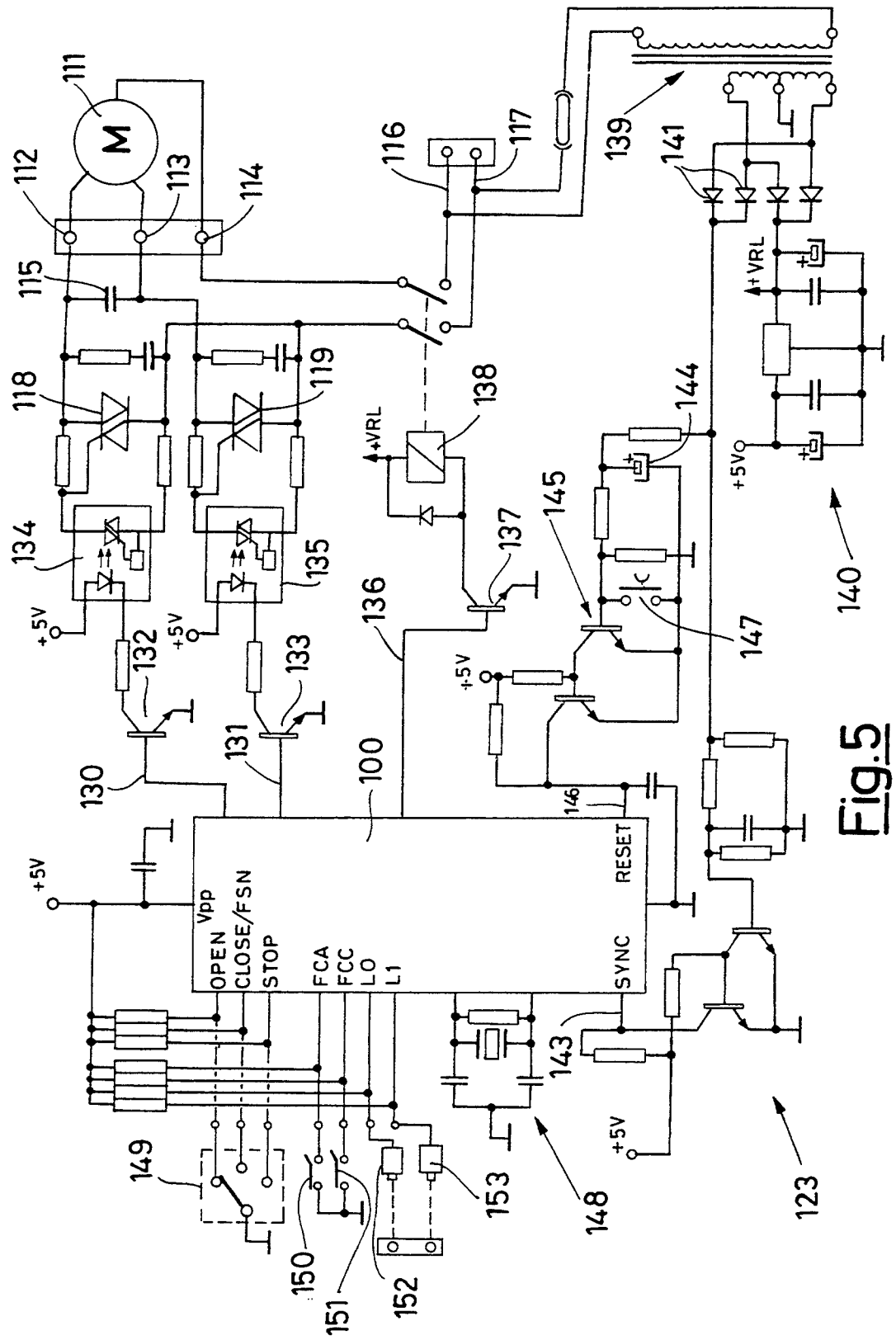
FIG. 5 shows an electric diagram of a control device in accordance with FIG. 1.

FIG. 5 shows an electrical circuit providing practically the block diagram of FIG. 1 by a microprocessor 100, e.g. the single chip type.

For the sake of clarity, elements of FIG. 5 analogous to elements of FIG. 1 are indicated by the same reference numbers preceded by the digit 1.

The microprocessor 100, having an oscillator stage 148 generating clock signals, comprises two outputs 130, 131 which control, through respective transistors 132, 133 elements 134, 135 of galvanic decoupling, e.g. optical decouplers, each controlling a triac, respectively 118, 119. The triacs fulfil the function of the switches 18, 19 of FIG. 1 and are therefore connected between a power line 117 and respective terminals 112, 113 of an asynchronous motor 111. Between the terminals 112, 113 is also connected a phase displacement capacitor 115.

The microprocessor 100 has still another control outlet 136 through a transistor 137 of a relay 138 with contacts for interruption of power 116, 117 to the motor.

The electronic circuit is powered by a transformer 139 and a voltage stabilising circuit 140. Through two diodes 141, from the secondary of the transformer 139 is also derived a pulsing voltage which is sent to a squaring circuit 123 supplying to an input 143 of the microprocessor impulses synchronous with the zeros of the network power supply sine wave.

The pulsing voltage taken from the diodes 141 is also levelled by a capacitor 144 and used, upon powering of the circuit, to supply through a squaring circuit 145 an initialisation impulse at the input RESET 146 of the microprocessor. Optionally there can be provided a push-button 147 to permit manual reinitialisation of the system without the need of interrupting power supply.

The microprocessor 100 comprises finally a plurality of inputs for sensing movement function control signals required at the motor. For example, if the motor is used for moving a gate or the like, it can be provided with a control circuit 149 controlling opening, closing or stopping of the gate sending corresponding signals to the microprocessor. This can be easily provided witch a 3-position commutator, optionally with a key, or more sophisticated devices such as remote controls as easy to imagine for those skilled in the art.

For movement of a gate there are also provided two limit switches arranged at the two ends of the gate travel and, advantageously, two photocells 153 for providing an optical barrier on the two sides of the gate as is normal for the specific application.

Although operation of the circuit of FIG. 5 is substantially the same as that described above with reference to the simple block diagram of FIG. 1, in the embodiment of FIG. 5 there are some minor differences due essentially to the specific practical embodiment. Indeed, since the microprocessor is engaged in various functions and there being always a finite time between detection of the synchronism signal at the input 143 and switching of the outputs 130, 131 controlling the triac, the accurate activation and deactivation in the moments of zero voltage in the power supply side wave of the motor was advantageously obtained with the use of photocouplers 134, 135 with a built-in zero detection function. In this manner, the microprocessor can emit the control signals (essentially similar to the signals E and F of FIG. 4) with small time differences compared with the zero instant of the sine wave. The photocouplers 134, 135 will synchronise, exactly with the zeros of the power sine wave, opening and closing of the controlled triacs. For example, suitable photocouplers could be the optotriac MOC3061 manufactured by Motorola with Zero Crossing device.

During operation, when the control 149 sends a signal, e.g. for opening, the microprocessor emits through the outputs 130, 131 motor starting signals as shown in FIG. 4c. Upon reaching the limit switch 150 of the fully open position, the microprocessor emits slowing and stop signals as shown in FIGS. 4a or 4b (depending on the specific operation used). Once the motor has fully stopped, the microprocessor commands opening of the contacts of the relay 138 so as to completely disconnect the power supply to the motor control triac circuit.

Again through the control 149, commanding closing of the gate, the microprocessor executes the same operations just described but exchanging emission of the signals from the outputs 130 and 131 so as to rotate the motor in the opposite direction. The limit switch which controls slowing and braking will be the limit switch For safety reasons during closing of the gate, any interruption of the rays of the photocells 150 or 151 signals to the microprocessor to interrupt closing and reopen the gate fully.

The limit switches 150 and 151 must be positioned at a distance from the mechanical limit switch positions such as to permit slowing of movement before impact with the mechanical limit switches so as to avoid problems of recoil and vibrations as already described.

At this point it is clear to those skilled in the art that the objectives of supplying an effective but economical asynchronous motor speed control, especially useful for motors moving gates, passage bars or the like, have been achieved. It is also obvious that in such applications the direction signal on the line 21 and the start and stop signal on the line 22 can be supplied by a normal and well-known control circuit for such operations in the conventional opening and closing devices such as for example indicated in FIG. 5, the signals being sent to lines 21, 22 instead of to conventional motor power supply relays.

Naturally the above description of an embodiment applying the innovative principles of the present invention is given merely by way of example and therefore is not to be taken as a limitation of the patent right claimed here.

For example, if the motor is always started by using 3-phase slowed power and then passes over to normal single-phase power supply, the capacitor 15, 115 can be eliminated. With normal power supply the motor behaves like a single-phase motor (null peak torque). There will however be a maximum torque less than that obtainable with the capacitor. In addition, if maximum torque is exceeded, the motor stops and is not able to restart by itself. As readily imaginable by those skilled in the part, the circuit providing the method claimed. here, alone or merged in a single circuit providing also the known conventional control art, can be constructed with electronic circuits having cabled or programmed logic, with microprocessor or discrete components. With merging in a single circuit comprising all the functions normally required of a gate-opening control circuit plus the innovative speed adjustments described above, there is obtained the advantage of low construction cost, great strength and reliability together with ease of installation comparable with that of conventional drives.

I claim:

1. A method for controlling the speed of an asynchronous electric motor having a first branch of electrical windings and a second branch of electrical windings out of phase with the first branch, comprising
   providing one single-phase power supply source, and
   selectively producing a first motor power supply condition for running the motor at rated speed in which the first branch is supplied by a single-phase sine wave voltage from said source, and the second branch is supplied by the same single-phase sine wave voltage through a phase shifting capacitor, and a second motor power supply condition in which each of said branches is supplied by a partialized voltage formed by said single-phase sine wave voltage from said source for a half-period of said sine wave every uneven number ns of half-periods for running said motor at a speed reduced to 1/ns of said rated speed.

2. Method in accordance with claim 1, in which for passage from a condition of running the motor at said rated speed to a condition in which the motor is stopped, there is produced also an interval during which said motor is run at a reduced speed.

3. Method in accordance with claim 1 wherein said second motor power supply condition is characterized in that said partialized voltage supplied to the second branch of electrical windings of the motor, is supplied through a phase shifting capacitor from the partialized voltage supplied to the first branch of electrical windings, thus supplying a reduced speed with single-phase power supply.

4. Method in accordance with claim 1 wherein said second motor power supply condition is characterized in that the partialized voltage supplied to the second branch of electrical windings is formed by said sine wave voltage for a half-period of the sine wave out of phase by a half-period in relation to the half-period taken for the partialized voltage supplied to the first branch, every uneven number ns of half-periods, thus supplying a reduced speed with synthesized 3-phase power supply.

5. Method in accordance with claim 1 comprising producing additional braking power in which said two phase-shifted branches of electrical windings of the motor are supplied with periodic voltages in phase mutually formed by at least part of the single-phases sine wave voltage.

6. Method in accordance with claim 5 characterized in that the periodic voltages are sine wave.

7. Method in accordance with claim 5 characterized in that the periodic voltages are formed by a half-period every two of the single-phase sine wave voltage.

8. Method in accordance with claim 4 characterized in that the passage of the motor from a rated speed rotation condition to a slowed speed rotation condition is effected by powering the motor for a first time period of predetermined duration with said single-phase power and subsequently with said synthesized 3-phase power.

9. Method in accordance with claim 4 characterized in that passage of the motor from a stopped motor condition to a rated speed rotation condition is effected by powering the motor for a first time period of predetermined duration with said synthesized 3-phase power and subsequently with said first motor power supply condition.

10. Device for control of the speed of an asynchronous electric motor having a first branch of electrical windings and a second branch of electrical windings out of phase with the first branch, the device comprising
    first motor power supply means for running the motor at a rated speed, said first power supply means being operable to supply the first branch from a single-phase sine wave voltage source, and to supply the second branch from the same single-phase sine wave voltage source through a phase shifting capacitor,
    second and third motor power supply means supplying, respectively, the first branch of electrical windings by a first partialized voltage, and the second branch by a second partialized voltage, said first and second partialized voltages being formed from said single-phase sine wave voltage source for a half-period of the sine wave every uneven number ns of half-periods for running said motor at a speed reduced to 1/ns of the ratered speed thereof,
    means for generating control signals for said motor, and control means for sending activation signals alternately to said first and second power supply means upon reception of control signals requiring running of said motor at rated speed and reduced speeds, respectively.

11. Device in accordance with claim 10 characterized in that the second power supply means forms the first partialized voltage connecting directly the single-phase sine wave voltage to the first branch for said half-period, and the third power supply means forms the second partialized voltage connecting the second branch to the first branch through said phase shifting capacitor.

12. Device in accordance with claim 10 characterized in that the second power supply means forms the first partialized voltage connecting directly the single-phase sine wave voltage to the first branch for said half-period, and the third power supply means forms the second partialized voltage connecting directly the single-phase sine wave voltage to the second branch for one half-period of the sine wave, phase shifted by a half-period in relation to the half-period taken for the first partialized voltage, every uneven number ns of half-periods, thus supplying reduced speed with synthesized 3-phase power supply.

13. Device in accordance with claim 10 characterized in that additional braking power supply means are connected to the first and second branches, and upon reception of braking command signals, the control means being operative to send to the braking power supply means an activation signal for power supply of the first and second branches with periodic voltages in phase mutually formed by at least part of the said single-phase sine wave voltage.

14. Device in accordance with claim 13 characterized in that the periodic voltages are sine wave.

15. Device in accordance with claim 13 characterized that the periodic voltages are formed by one half-period every two of the single-phase sine wave voltage, 16. Device in accordance with claim 12 characterized in that the control means is operative, upon reception of command signals upon passage of said motor from a rated speed rotation condition to a slowed speed rotation condition, to send for a first time interval of predetermined duration activation signals to the second power supply means for command said single-phase power supply, and subsequently to send activation signals to the second and third means to command said synthesized 3-phase power supply.

17. Device in accordance with claim 12 characterized in that the control means is operative, upon reception of command signals upon passage from a stopped motor condition to a rated speed rotation condition to send activation signals to the second and third means to command said 3-phase power supply for a first time period of predetermined duration and subsequently send a command signal to the first means to command power supply of the motor with said sine wave voltage.

18. Device in accordance with claim 10 characterized in that the first and second power supply means comprise a first switch element placed between said single-phase sine wave voltage source and the first branch, the control means sending a closing signal to the first switch element for the entire period of the sine wave for providing the first power Supply means and a closing signal for one half-period every ns to provide the second power supply means.

19. Device in accordance with claim 18 characterized that the third power supply means comprise a second switch element placed between the sine wave voltage source and the second branch, the control means sending a closing signal to the second switch element for a half-period every ns.

20. Device in accordance with claim 19 characterized in that means is operative to cause the control means to be connected to said control signal generating means upon the passage through zero of the sine wave voltage source, thereby synchronising the closing and opening of the switch elements with moments coincident with said passage through zero.

21. Device in accordance with claim 19 characterized in that the switch elements are static semiconductor switches.

22. Device in accordance with claim 21 characterized in that the static switches are triacs.

23. Device in accordance with claim 21 characterized in that the static switches receive the closing signals through galvanic decoupling elements.

24. Device in accordance with claim 23 characterized in that the galvanic decoupling elements are photocouplers.

25. Device in accordance with claim 24 characterized in that the photocouplers comprise synchronisation means for command of opening and closing with the zero crossovers of the sine wave voltage of the source.

26. Device in accordance with claim 10 characterized in that the control means comprise a microprocessor circuit having command signal reception inputs and outputs for emission of the activation signals.

27. Device in accordance with claim 10 characterized in that the electric motor is a 3-phase motor comprising first and second branches of electric windings star connected together.

28. Device in accordance with claim 10 characterized in that the electric motor is a 3-phase motor comprising first and second electric winding branches triangle connected together.

29. Device in accordance with claim 10 characterized in that the electric motor is a single-phase motor comprising two windings forming said first and second electric winding branches and connected together with a common end.

30. Device in accordance with claim 10 characterized in that the control means are connected to command means for activation and disactivation of the running of the motor, said command means sending to the control means slowed motor running signals before sending motor disactivation signals.

31. Device in accordance with claims 30 characterized in that the control means for activation and disactivation of the running of the motor sends to the braking signals to said motor between the sending of the slowed running signals and the motor disactivation signals.

32. Device in accordance with claim 30 characterized in that the control means for activation and disactivation of the motor running comprise spaced limit switches arranged for operation at the ends of a path traversed by a barring element kinematically connected for its movement to the electric motor, each said limit switch effecting disactivation of the motor upon being operated by the barring element as it reaches one end of its travel.

33. Device in accordance with claim 30 characterized in that the command means for activation and disactivation of the motor running comprise a manual command circuit for activation and disactivation of the motor.

* * * * *